(12) United States Patent
Erdmann et al.

(10) Patent No.: US 9,622,093 B2
(45) Date of Patent: Apr. 11, 2017

(54) SYSTEM AND METHOD OF TRANSMITTING A MESSAGE TO A WIRELESS LIMITED NODE

(71) Applicant: PHILIPS LIGHTING HOLDING B.V., Eindhoven (NL)

(72) Inventors: Bozena Erdmann, Aachen (DE); Ludovicus Marinus Gerardus Maria Tolhuizen, Waalre (NL); Armand Michel Marie Lelkens, Heerlen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/381,649

(22) PCT Filed: Mar. 4, 2013

(86) PCT No.: PCT/IB2013/051702
§ 371 (c)(1),
(2) Date: Aug. 28, 2014

(87) PCT Pub. No.: WO2013/132410
PCT Pub. Date: Sep. 12, 2013

(65) Prior Publication Data
US 2015/0016440 A1 Jan. 15, 2015

Related U.S. Application Data

(60) Provisional application No. 61/607,664, filed on Mar. 7, 2012.

(51) Int. Cl.
*H04W 24/02* (2009.01)
*H04W 4/00* (2009.01)
(Continued)

(52) U.S. Cl.
CPC ............ *H04W 24/02* (2013.01); *H04W 4/001* (2013.01); *H04W 4/20* (2013.01); *H05B 37/0272* (2013.01); *H04W 84/18* (2013.01)

(58) Field of Classification Search
CPC ....... H04W 84/18; H04W 4/20; H04W 4/001; H04W 24/02; H05B 37/0272
See application file for complete search history.

(56) References Cited

U.S. PATENT DOCUMENTS 5,543,784 A * 8/1996 Mendenhall ............ F24C 15/16
200/85 R
2010/0165861 A1 7/2010 Rrdland et al.
(Continued)

FOREIGN PATENT DOCUMENTS

| WO | 2008099308 A2 | 8/2008 |
|---|---|---|
| WO | 2010128422 A1 | 11/2010 |
| WO | 2012168819 A1 | 12/2012 |

OTHER PUBLICATIONS

"Zigbee Control Your World", Zigbee Document 095499, Draft Zigbee Green Power Specification, Oct. 27, 2011, Version 0.9, Revision 18, pp. 1-171.

*Primary Examiner* — Ajay Cattungal
(74) *Attorney, Agent, or Firm* — Meenakshy Chakravorty

(57) ABSTRACT

Methods are provided for transmitting and receiving a message to or form a wireless limited node (10) in a wireless network (100) wherein the wireless limited node (10) is related to a coupled device (30) in the wireless network (100) and is able to receive data only within limited reception opportunities following transmission by the wireless limited node (10). The method of transmitting comprises noticing a need for transmitting the message to the wireless limited node (10), preparing the message to be transmitted, the coupled device (30) changing a physical parameter for triggering external activation of the wireless limited node (Continued)

(10), and after receiving a signal transmitted by the wireless limited node (10) upon said external activation, sending the message to be transmitted to the wireless limited node (10) within the limited reception opportunities. The method of receiving does not comprise the steps of preparing the message and transmitting it to the wireless limited node (10). In the method of receiving, the message to be received is part of the signal transmitted upon activation.

13 Claims, 2 Drawing Sheets

(51) Int. Cl.
  *H04W 4/20* (2009.01)
  *H05B 37/02* (2006.01)
  *H04W 84/18* (2009.01)

(56) References Cited

U.S. PATENT DOCUMENTS

| | | | | |
|---|---|---|---|---|
| 2011/0092159 A1* | 4/2011 | Park | ..................... | H04L 63/102 |
| | | | | 455/41.2 |
| 2011/0259368 A1* | 10/2011 | Hofte | ................. | A47L 15/4445 |
| | | | | 134/18 |
| 2013/0003620 A1* | 1/2013 | Dame | .................... | H01Q 1/007 |
| | | | | 370/310 |
| 2014/0115132 A1* | 4/2014 | Erdmann | ............. | H04W 24/02 |
| | | | | 709/222 |

\* cited by examiner

SYSTEM AND METHOD OF TRANSMITTING A MESSAGE TO A WIRELESS LIMITED NODE

CROSS-REFERENCE TO PRIOR APPLICATIONS

This application is the U.S. National Phase application under 35 U.S.C. §371 of International Application No. PCT/IB13/051702, filed on Mar. 4, 2013, which claims the benefit of U.S. Provisional Patent Application No. 61/607,664, filed on Mar. 7, 2012. These applications are hereby incorporated by reference herein.

FIELD OF THE INVENTION

This invention relates to a method of communicating with a wireless limited node in a wireless network wherein the wireless limited node is able to receive data only within limited reception opportunities following transmission by the wireless limited node.

This invention further relates to a wireless network comprising a wireless limited node which is able to receive data only within limited reception opportunities following transmission by the wireless limited node.

The invention also relates to a computer program product for communicating with a wireless limited node in a wireless network, which program is operative to cause a processor to perform the above described method

BACKGROUND OF THE INVENTION

In a network, in particular in a wireless network, it is required to keep every node updated with the currently used value of network configuration parameters to maintain a correct operation for each node of the network. Indeed, it is possible that, due to unscheduled events, like a change in the interference spectrum or location, or due to scheduled events, like a periodic change of cryptographic key, a maintenance entity needs to communicate a new value for a network configuration parameter, like a channel identifier, a network identifier, node identifier or role, identifier of a new coordinator/maintenance entity inside the network, a cryptographic key or a key seed.

However, in some networks, there can be some nodes that are limited in terms of reception opportunities. As an illustration, in a ZigBee network, there may be ZigBee Green Power Devices (ZGPDs), which do not have a battery or are otherwise limited in terms of operational energy. A ZGPD may harvest its own energy, e.g. using solar cells. Such devices can receive data or instructions only at unscheduled opportunities. For example, a ZGPD can be a user-operated battery-less switch that can only receive for a short time once it is actuated by a user and has transmitted its signal. Another example of a ZGPD is a frequently reporting sensor, harvesting energy from its environment, e.g. by means of a photovoltaic cell. The sensor may, e.g., detect temperature, occupancy, or light. Because of their energy budget limitations, those devices are also not able to discover the new parameters via an active search or might not even be able to discover the parameter change.

Given that these devices cannot receive a configuration signal at any arbitrary time, if a reconfiguration of the network occurs in the interval between two reception opportunities of a limited device, this limited device would be unaware of the change in the parameter value. This is likely to cause the limited device to be excluded from the network, since it would still use the previous version of the network parameters and is likely not to be heard by its neighbors which have been updated (e.g. in case of channel changes) or its message may be dropped (e.g. in case of network identifier change or key change). For such wireless limited node to be reintegrated in the network, it requires a special process which is very likely to require manual intervention from the user, can be long and is thus a large maintenance burden. Similar problems are also relevant when not sending network configuration updates but other types of messages that have to reach the limited node, such as for example measurement data, change in the wireless node reporting behavior, e.g. reporting frequency, measurement thresholds, etc.

An example of a method and system trying to overcome these problems is described in the pending Philips patent application EP11305720.2. In said patent application it is proposed to postpone updating the wireless non-limited nodes in the network until the wireless limited node is detected and updated. However, if the network is not aware of the presence of the wireless limited node or if no reception opportunities arise, postponing the update will not work. Undetected nodes will not be updated and will not be part of the network anymore. If no reception opportunity arises at all, the update of the complete system may be postponed or cancelled. If the update does take place, the limited node will not be part of the network anymore Furthermore, for such wireless limited nodes, it may be impossible to check correctness of their configuration and operation with respect to, e.g., the wireless configuration parameters such as channel, security key, options, peer devices, network, and application operation, like sensor calibration, reporting frequencies and thresholds and application logic, especially on-demand and remotely. Such checks may be required e.g. during scheduled system maintenance operations; or in case of commissioning or debugging the system, e.g. upon addition or replacement of a node in a wireless network, upon control functionality re-configuration, etc. They may be further used for checking reliability of the wireless connection. Further, such checks can be required in periods of prolonged absence of signals transmitted by the wireless limited device (e.g. caused by lack of condition change or user absence).

OBJECT OF THE INVENTION

It is an object of the invention to provide to overcome the aforementioned problems with receiving information from and sending information to such wireless limited nodes.

SUMMARY OF THE INVENTION

According to a first aspect of the invention, this object is achieved by providing a method of transmitting a message to a wireless limited node in a wireless network wherein the wireless limited node is related to a coupled device in the wireless network and is able to receive data only within limited reception opportunities following transmission by the wireless limited node. The method comprises noticing a need for transmitting the message to the wireless limited node, preparation of the message to be transmitted, the coupled device changing a physical parameter for triggering external activation of the wireless limited node, and after receiving a signal transmitted by the wireless limited node upon said external activation, sending the message to be transmitted to the wireless limited node within the limited reception opportunities.

With 'coupled device', a device is meant that is related to the wireless node because it can trigger the external activation. For example a lamp is coupled with a user-operated switch and changing the lighting conditions triggers a user to press or toggle the button. In a further example, the lamp is coupled with a sensor and the changing lighting conditions trigger the sensor to transmit a message. By changing the physical parameter for triggering external activation of the wireless limited node, the chances of an opportunity for sending commands or other messages to the wireless limited node are substantially increased. The message to be transmitted may, for example, comprise a network configuration update or parameters determined by other devices and relevant for the functioning of the wireless node. In the following, the coupled device is a lamp and the wireless limited node a wireless energy harvesting switch. The invention is, however, not limited to this embodiment. The changing of the physical parameter may comprise turning the lamp on or off or making it blink. The changing lighting conditions trigger a user to activate the switch for bringing back the original, preferred, lighting conditions. The activation of the switch then results in one of the limited reception opportunities during which the prepared message is sent to the wireless limited node for updating the relevant configuration parameters. Instead of a switch, the wireless limited node may, e.g., be a light sensor or solar powered thermostat. Upon detecting the changing lighting conditions (e.g. an increased or decreased light intensity) or a predetermined lighting pattern (e.g. a specific blinking pattern), the sensor contacts a device in the wireless network and provides an opportunity to receive data. The physical parameter to be changed may also involve aspects other than lighting conditions. For example, a microphone may detect changing noise levels or predetermined sound patterns or a gas sensor may detect specific gas molecules that have just been released by the coupled device. Also energy harvesters may be used for transmitting a message when the harvest includes, e.g., a predetermined or unusual amount of energy. Examples of energy harvesters are photovoltaic cells, user-operated electro-mechanical harvesters, thermoelectric elements, flow-based mechanical harvesters, electro-magnetic harvesters, vibration-based harvesters or piezo-elements. If the limited node is a sensor or energy harvester, the physical condition is preferably changed in such a way that is only perceivable for the sensor and not for users of the system. A flow sensor may be used for detecting a change in the flow of a medium or a temperature sensor for detecting a temperature change.

In an embodiment of the method according to the invention, the wireless limited node is a ZigBee Green Power Device (ZGPD) or other type of batteryless, energy harvesting device.

The noticing of a need for transmitting the message to the wireless limited node may be performed by the network manager node. This may be especially advantageous in case of change of network-wide applicable parameters, like e.g. the security key or the operational channel. By the network manager we define any role in the wireless network which is capable and/or entitled to manage any configuration parameters of some/all devices of the network. For example, in ZigBee, the roles can be performed by the Trust Centre node and the Network Manager node. However, the method according to the invention provides the same advantages when the need for transmitting the message to the wireless node is performed by the device paired to the wireless limited node. This may be especially advantageous in case of change of application parameters applicable specifically to this wireless limited node, like e.g. reporting behavior.

The preparation and/or the sending of the message to be transmitted may be performed at a proxy device for relaying communication between the wireless limited node and other devices in the wireless network. For example, in ZGPDs operating in ZigBee networks usually communicate with other devices in the wireless network via a nearby proxy (ZGPP). However, the method according to the invention provides the same advantages when the wireless limited node communicates with the coupled device directly.

The coupled device may be the device configured to execute the commands of the wireless limited node. In ZigBee Green Power terms this is the 'paired device'. For example a ZigBee Green Power Sink (ZGPS) device is paired with the ZGPD. However, the method according to the invention provides the same advantages when the coupled device is any other device in the wireless network, including the proxy. The coupled devices can be appointed proactively per ZGPD or selected at the time of noticing the need for transmitting the message to the wireless limited node. The method according to the invention provides the same advantages when the coupled device does not have a control relationship (pairing) with the wireless limited node. There may be more than one coupled device changing a physical parameter for triggering reception opportunity at wireless limited node.

The node noticing the need and/or preparing the sending does not necessarily need to be physically located on the wireless network, it may communicate with it using bridging and/or gateway techniques, as known in the art.

The invention also concerns a method of receiving a message from a wireless limited node in a wireless network wherein the wireless limited node is related to a coupled device in the wireless network and is able to receive data only within limited reception opportunities following transmission by the wireless limited node, the method comprising noticing a need for receiving the message from the wireless limited node, the coupled device changing a physical parameter for triggering external activation of the wireless limited node, upon the external activation of the wireless node, transmission of the message by the wireless limited node, and receiving of the message by the wireless network.

In this situation, there is no need of sending a particular message to the wireless node, but there is a need to receive information. For example, a coupled device, a paired device, a network manager or another device wants to know whether the limited node is still there and able to perform its tasks. In another example, the limited node is a temperature sensor and some device in the network wants to receive a non-scheduled update of the latest temperature measurements. Changing the physical parameter and the subsequent external activation may then cause the limited node to transmit a standard response, which may include recent measurement data.

According to a second aspect of the invention, a computer program product for sending a message to a wireless limited node in a wireless network is provided, which program is operative to cause a processor to perform one of the methods as described above.

According to a third aspect of the invention, a wireless network is provided. The network comprises at least the wireless limited node, the coupled device and the network manager for together performing the method as described above. Optionally the wireless network further comprises a proxy device for relaying communication between the wireless limited node and the coupled device.

These and other aspects of the invention are apparent from and will be elucidated with reference to the embodiments described hereinafter.

DETAILED DESCRIPTION OF THE INVENTION

Figure 1:
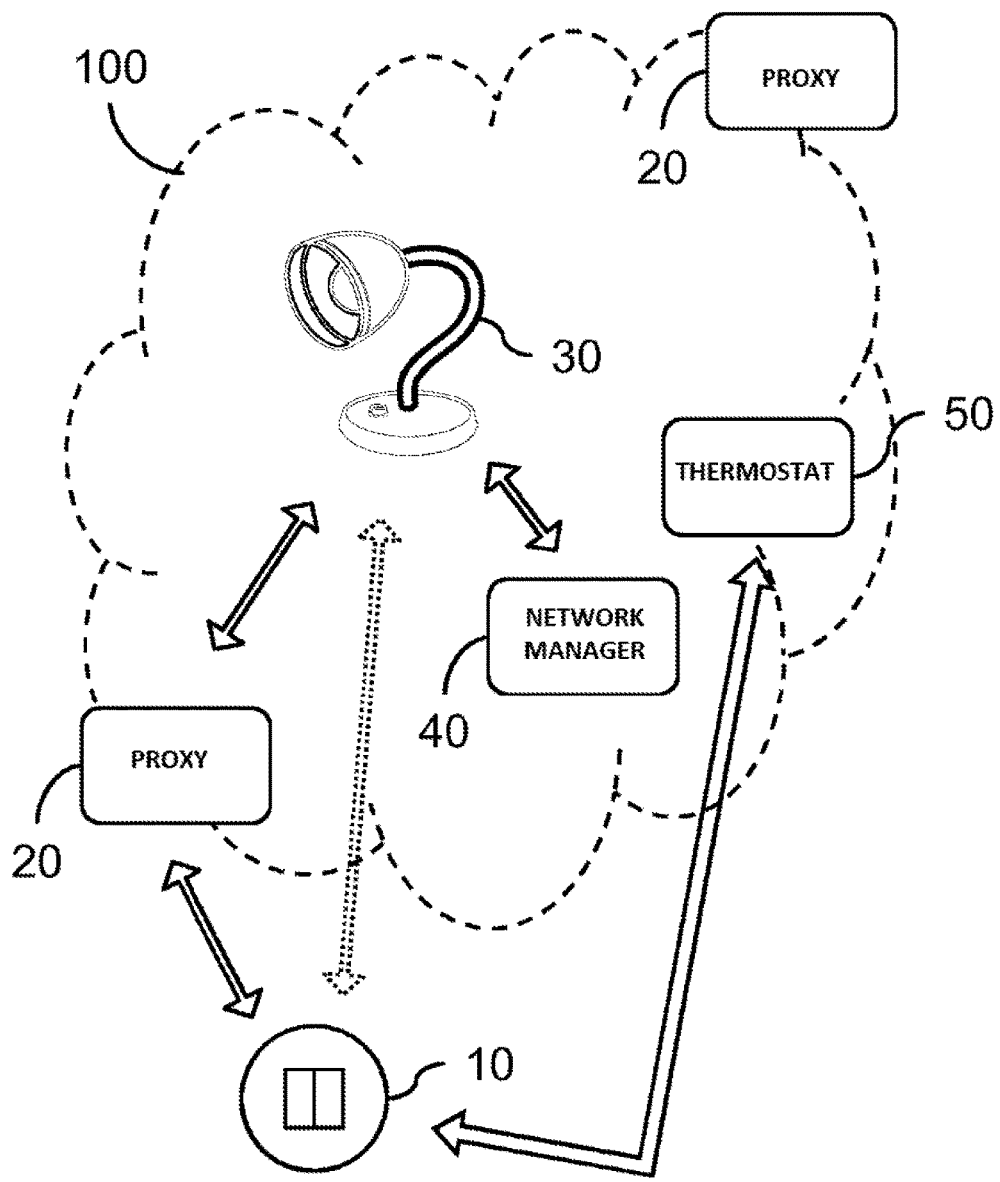
FIG. 1 schematically shows a wireless network according to the invention.

FIG. 1 schematically shows a wireless network 100 according to the invention. The wireless network 100 comprises a network manager 40, a lamp 30 and a proxy 20. An energy harvesting switch 10 is provided for turning the lamp 30 on or off. The switch 10 may communicate with the lamp 30 directly or via the nearby proxy 20. An advantage of communicating via the nearby proxy 20 is that the lamp 30 does not have to be within direct range of the switch 10. When either the lamp 30 or the switch 10 is relocated a different proxy 20 may take over the communication tasks.

In the following, it is to be noted that this network 100 with a lamp 30, controlled by an energy harvesting switch 10 is just shown as an example. The invention may provide similar or equal advantages when the switch 10 is used for controlling other types of devices, e.g. TVs, radios, heaters, air-conditioning, blinds, doors, windows, . . . . It is further to be noted that the wireless limited node 10 does not need to be a switch 10, but may, e.g., also be an energy-harvesting sensor or remote control.

The wireless network 100 preferably is a ZigBee or ZigBee compliant network 100. The wireless limited node 10 may then, e.g., be a ZigBee Green Power Device (ZGPD) 10. ZGPDs 10, like energy-harvesting switches and battery-less sensors, are operating in ZigBee networks 100. However, the method according to the invention can also be applied to other wireless network protocol, including IEEE 802.15, IEEE 802.11, Bluetooth, Wi-Fi, ZigBee, and 6LoW-PAN. The wireless limited node 10 may then, e.g., be the ZigBee Green Power device, an EnOcean device, or a device natively supporting the protocol of the wireless network. In ZigBee networks 100, the configuration parameters, such as key, channel, PANId, etc., may need to change. ZGPDs 10 with their very limited energy budget are neither guaranteed to receive the update before it takes effect, nor capable to discover the change and self-adjust. The result is the necessity of manual re-commissioning, which is time-consuming, manually-intensive due to limited communication and User Interface (UI) capabilities of the ZGPD 10, and also invalidates the major claim of energy-harvesting ZGPDs 10: their maintenance-free operation. It is to be noted that the wireless network 100 may also comprise devices that do not use wireless communication. For the invention, it is only relevant that the limited node 10 and all devices directly communicating with the limited node 10 are capable of wireless communication.

According to the ZGP specification as defined in ZigBee Document 095499, "Draft ZigBee Green Power Specification", version 0.9, revision 18, Oct. 27, 2011, section A.1.6.3, a ZGPD 10, if it has sufficient energy budget, can, at selected times, receive a message for a limited time just after it has sent a message. In case of a ZGPD switch 10, the energy for both receiving and sending comes from one and the same rocker toggling by the user. The ZGPD 10 indicates the reception capability in the regular frame it sends, upon user or sensor or application or time or harvester/energy storage trigger, by setting an RxAfterTx flag. 5 ms after this transmission, the ZGPD 10 opens its radio for reception, for at least 0.576 ms and usually not much longer. Because of this very time-constrained mechanism, the senders transmitting to the wireless limited node 10 do not use carrier-sense multiple access with collision avoidance (CSMACA), in order to not waste the transmission opportunity. Thus, it is crucial that only one device is transmitting to the ZGPD 10, otherwise, the multiple transmissions will collide with probability close to 1. To this aim, the ZGP specification defines a TempMaster election procedure, such that a sink (e.g. the lamp 30) controlled by the ZGPD 10 selects one device from the proxies 20 forwarding on behalf of this particular ZGPD 10 and itself, if it is in radio range of the ZGPD 10, by using the criteria of distance to originating ZGPD 10 and the ZGP infrastructure device's short address 10. More details of the TempMaster selection procedure are found in the pending patent application with ZigBee Document 095499, "Draft ZigBee Green Power Specification", version 0.9, revision 18, Oct. 27, 2011, section A.3.6.2.3.

Figure 2:
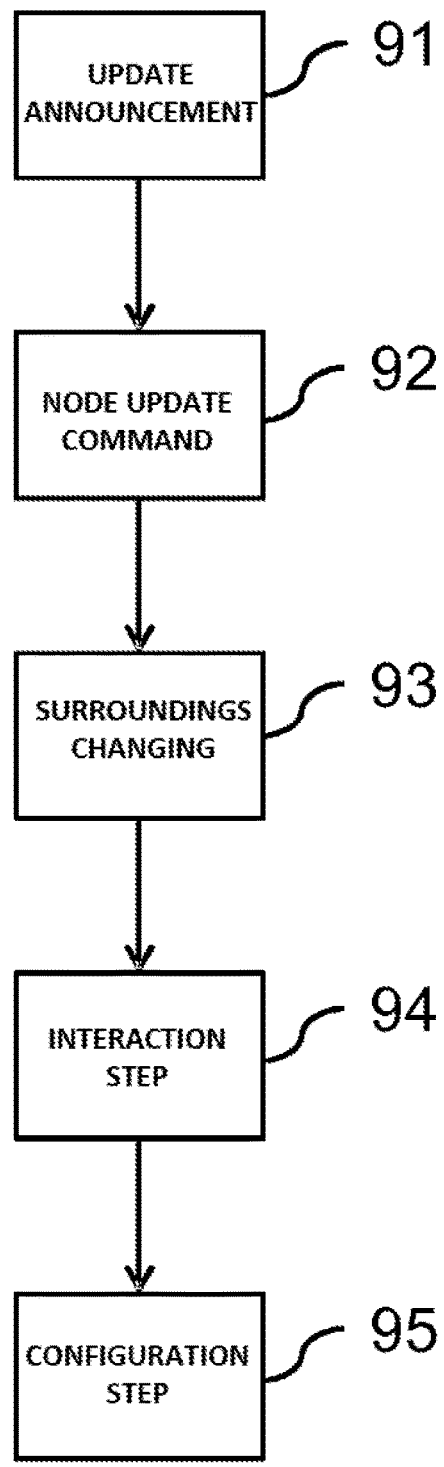
FIG. 2 shows a flow diagram of a method according to the invention.

The present invention provides a solution for efficient and reliable delivery of changed network parameters to ZGPDs 10 operating in ZigBee networks 100. An exemplary flow diagram of a method according to the invention is shown in FIG. 2. The method starts with an update announcement step 91 in which the network manager 40 starts the process of informing devices in the network about changes to the network configuration by sending an update announcement to the lamp 30 and/or other devices in the wireless network 100. In a ZigBee compliant network 100, the network manager 40 may, e.g., be a Trust Centre or ZigBee PAN Coordinator. It is to be noted that the network manager 40 may have a wired connection to the lamp 30 and/or the other devices in the network 100. The network manager 40 may be a separate device, but may also be integrated in the lamp 30 or another device in the network 100.

The lamp 30 is paired with the switch 10, which here means that the switch 10 controls the operation of the lamp 30, communicating with the lamp 30 either directly or via the proxy 20. Thus, when a user operates the switch 10, the proxy 20 and/or the lamp 30 is informed about the switch activation and the operation mode of the lamp 30 may be changed accordingly. If the update announcement received by the lamp 30 also applies to the switch 10, in a node update command step 92, the lamp 30 prepares an update command for the switch 10. Because the switch 10 is probably not in a data receiving mode at the moment this update command is prepared, it cannot be sent to the switch 10 immediately. Instead, the lamp 30 might hold the update command in a buffer memory of the lamp itself, if the lamp 30 is in direct range of the switch 10. If communication between the lamp 30 and the switch 10 is realized via the proxy 20, then the update command is sent to and temporarily stored in the proxy 20. In a ZigBee network 100, the update command will be sent to whichever device in the network that is appointed TempMaster 20 for this lamp-switch pair.

Then in surroundings changing step 93, the lamp 30 changes its light output. For example, the lamp 30 may change its intensity, color, light direction, beam width, blinking pattern or the number of active light elements. When the user observes the change in lighting conditions, he will go to the switch 10 and use it to bring the lighting system back to its original behavior.

When the switch 10 is operated, a user interaction command is sent to the lamp 30 or the proxy 20 in interaction step 94. Preferably, the user interaction command indicates reception opportunity following this user interaction command. The user interaction command will cause the lamp 30 to adapt its lighting behavior to the wishes of the user. Alternatively, if multiple switches 10 have to be updated the lamp 30 may not immediately adapt its lighting behavior. Instead, the lamp 30 may wait until the user has activated all the switches 10 to ensure that all switches 10 receive the configuration update before the lighting conditions are brought back to normal.

In response to the received user interaction command with the indication of reception opportunity, the proxy 20 or the lamp 30, whichever has the update command for the switch 10 stored, immediately replies with the already prepared update command in configuration step 95. Because the update command immediately follows the user interaction, it will fall within the limited reception opportunity of the switch and will thus be received and processed by the switch 10. After having been updated, the switch 10 can power down, or enter sleep mode and does not have to become active again until it is activated by the user again.

The reception of the user interaction or transmission of the update command or the confirmation of successful receipt of the update command by the switch 10 will cause the lamp 30 to adapt its lighting behavior to the wishes of the user. Alternatively, if multiple switches 10 have to be updated the lamp 30 may not immediately adapt its lighting behavior. Instead, the lamp 30 may wait until the user has activated all the switches 10 to ensure that all switches 10 receive the configuration update before the lighting conditions are brought back to normal.

When the configuration of the switch 10 is updated, also the other devices in the wireless network 100 can be updated without risking the switch to be excluded from the network. Alternatively, the other devices in the network are already configured when the update announcement is made in step 91. In that event, the lamp 30 or the proxy 20 may also be reconfigured earlier, but should still be able to communicate with the not updated switch 10 until also the switch is reconfigured.

It is to be noted that the above described method also works when the wireless limited node 10 is, e.g., an energy-harvesting sensor and/or when the paired device 30 is not a lamp 30 but, e.g., a radio, TV, air conditioning device, electrically controlled sun blinds. For example, if the wireless limited node 10 is an energy-harvesting temperature sensor, powered via a photovoltaic cell, and paired to a thermostat 50, the surroundings change can be performed by a coupled device capable of influencing the amount of energy harvested by the sensor's photovoltaic cell, e.g. a lamp 30 or electrically controlled sun blind, e.g. located in the same room zone. Then, the method may further include steps for determining the coupled device, instructing the coupled device to perform the surroundings change, and instructing the coupled device to undo the surroundings change. A standard control message or a dedicated maintenance message may be sent, wherein the message may specify any of the physical parameters to change, the required way of changing the parameter, the duration of the change, and the time of the change.

In principle, any electronic device or apparatus that is able to cause a detectable state change in its environment or somewhere else, can be used in the method and network according to the invention. The state change can be detected either by a user or by a sensor. The reaction of the user or sensor to the detected state change results in interaction of the wireless limited node 10 with the proxy 20, with the coupled device 30 or with another device in the network 100, which interaction leads to a subsequent opportunity for the wireless limited node 10 to receive the configuration update command.

In the following example, the wireless limited node 10 is a light sensor harvesting energy with a photovoltaic cell, and the coupled device 30 is at least one lamp in direct range, in physical vicinity and paired to the sensor 10. The lamp 30 has a program instructing it to deliver calibration data to the sensor 10 at scheduled times. The lamp 30 prepares a frame for transmission to the sensor 10. If the lamp 30 has no transmission opportunity for a given time (e.g. due to no transmission by the sensor or due to transmission by the sensor not indicating reception opportunity), the lamp 30 changes the physical condition perceivable to sensor 10, e.g. turns on to full intensity.

Once the physical condition changes and the sensor 10 harvests enough energy for transmission, it transmits a signal, indicating reception opportunity. The lamp 30 can then deliver the prepared frame with the calibration data to the sensor 10; the lamp 30 turns back to the previous state. Additional steps can be performed by the lamp 30 upon reception of sensor's 10 signal, e.g. checking correctness of wireless configuration, security configuration/processing, or application operation (e.g. reported light level) of sensor 10. If some checks fail or no signal is received, the lamp may continue/repeat the procedure; or may trigger another maintenance operation, automated or manual.

The following example illustrates the method of the present invention for automated, on-demand enforcing transmission from the wireless limited node 10 operating in a wireless network 100. The method starts with a first node 40 (e.g. a network manager role 40, e.g. a building management system, or a paired device 30) determining the need of receiving a message from the wireless limited node 10. It can e.g. be a scheduled system maintenance operation, a system debugging operation. In the following example, the wireless limited node 10 is a temperature sensor 10 harvesting energy with a photovoltaic cell, the coupled device 30 is at least one lamp in physical vicinity of the sensor 10, and the first node 40 is a building management system (BMS). The BMS 40 communicates with the sensor 10 via at least one proxy 20.

The BMS 40 instructs the proxy 20 forward any communication from the sensor 10 to the BMS 40. The BMS 40 also instructs the lamp(s) 30 to turn on with a given operation mode, e.g. light intensity level. Once the lamp 30 changes the physical condition and the sensor 10 harvests enough energy for transmission, it transmits a signal. The proxy 20 receives the signal and forwards to the BMS 40. Prior to forwarding, the proxy 20 may perform some processing steps on the signal, e.g. checking correctness of the low-level wireless configuration or security configuration of the sensor 10.

The BMS 40 receives the forwarded signal from the proxy 20 and evaluates the signal. A lack of signal from the sensor 10 proxy 20 within a given time is also a result. Depending on the evaluation result, the BMS 40 may continue/repeat the maintenance procedure, finish the maintenance procedure, including instructing the lamp(s) to switch back to previous state and removing the pairing to the BMS at the proxy(s), or may trigger another maintenance operation, automated or manual.

Upon successful completion of the procedure, the BMS 40 may instruct the proxy 20 to stop forwarding the communication from the sensor 10 to the BMS 40 and/or the lamp(s) 30 to a given operation mode. The BMS 40 may repeat those steps for other nodes in the network 100, incl., other wireless limited nodes.

In the following example, the wireless limited node 10 is a light sensor 10 harvesting energy with a photovoltaic cell, and the coupled node 30 is at least one lamp 30 in physical vicinity and paired to the sensor 10; communicating with the sensor 10 via at least one proxy 20. The lamp 30 has a program instructing it to turn its light on to full intensity if no signal is received from the sensor 10 for a defined time. Preferably, the defined time is much longer than the usual reporting interval of the sensor, and the time of execution is selected such to create minimum impact on the human users e.g. for office buildings—outside of office hours. In the absence of signal from sensor 10, the lamp 30 turns on to full intensity. Once the physical lighting condition changes and the sensor 10 harvests enough energy for transmission, it transmits a signal. The proxy 20 receives a signal from the sensor 10, and forwards it to the lamp. The lamp 30 receives a signal from the sensor 10 forwarded by the proxy; the lamp 30 turns back to the previous state.

Additional steps can be performed by the proxy 20 and/or lamp 30 upon reception of sensor's 10 signal, e.g. checking correctness of wireless configuration, security configuration/processing, or application operation (e.g. reported light level) of sensor 10. If some checks fail or no signal is received, the lamp may continue/repeat the procedure; or may trigger another maintenance operation, automated or manual.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of transmitting a message to a wireless energy-harvesting node in a wireless network wherein the wireless energy-harvesting node is related to a coupled device in the wireless network and is able to receive data only within reception opportunities limited in time following transmission by the wireless energy-harvesting node, the method comprising:
noticing a need for transmitting the message to the wireless energy-harvesting node,
preparation of the message to be transmitted,
the coupled device changing a physical parameter for triggering external activation of the wireless energy-harvesting node, wherein the coupled device comprises a lamp and wherein the changing of the physical parameter comprises changing a light output condition selected from the group consisting of light intensity, light color, light direction, light beam width, light blinking pattern and a number of active light elements, and
after receiving a signal transmitted by the wireless energy-harvesting node upon said external activation, sending the message to be transmitted to the wireless energy-harvesting node within the limited reception opportunities.

2. The method according to claim 1, wherein the coupled device comprises a sound generating device and wherein the changing of the physical parameter comprises generating a predetermined sound.

3. The method according to claim 1, wherein the wireless energy-harvesting node is an energy-harvesting switch and wherein the external activation of the wireless energy-harvesting node comprises a user operating the switch.

4. The method according to claim 1, wherein the wireless energy-harvesting node is an energy-harvesting sensor and wherein the external activation comprises the energy-harvesting sensor detecting a change of the physical parameter.

5. The method according to claim 1, wherein the wireless energy-harvesting node is a ZigBee Green Power Device.

6. The method of transmitting a message to a wireless energy-harvesting node in a wireless network according to claim 1, wherein the sending of the message to be transmitted is performed by a proxy device for relaying communication between the wireless energy-harvesting node and other devices in the wireless network.

7. The method of transmitting a message to a wireless energy-harvesting node in a wireless network according to claim 1, wherein the sending of the message to be transmitted is performed by the coupled device.

8. The method of transmitting a message to a wireless energy-harvesting node in a wireless network according to claim 1, wherein the sending of the message to be transmitted is performed by a further device in the wireless network, which further device is controlled by or receives input information from the wireless energy-harvesting node.

9. A computer program product for transmitting a message to and/or receiving a message from a wireless energy-harvesting node in a wireless network, which program is operative to cause a processor to perform the method as claimed in claim 1.

10. A method of receiving a message from a wireless energy-harvesting node in a wireless network wherein the wireless energy-harvesting node is related to a coupled device in the wireless network and is able to receive data only within unscheduled reception opportunities following transmission by the wireless energy-harvesting node, the method comprising:
noticing a need for receiving the message from the wireless energy-harvesting limited node,
the coupled device changing a physical parameter for triggering external activation of the wireless energy-harvesting node, wherein the coupled device comprises a lamp and wherein the changing of the physical parameter comprises changing a light output condition selected from the group consisting of light intensity, light color, light direction, light beam width, light blinking pattern and a number of active light elements,
upon the external activation of the wireless energy-harvesting node transmission of the message by the wireless energy-harvesting node, and
receiving of the message by the wireless network.

11. An apparatus comprising means for exchanging messages with a wireless energy-harvesting node in a wireless network wherein the wireless energy-harvesting node is related to the apparatus in the wireless network and is able to receive data only within reception opportunities limited in time following transmission by the wireless energy-harvesting node, the apparatus further comprising:
control means for noticing a need for communicating with the wireless energy-harvesting node,
the control means being adapted to change a physical parameter for triggering external activation of the wireless energy-harvesting node, wherein the change of the physical parameter comprises a change in a light output condition selected from the group consisting of light intensity, light color, light direction, light beam width, light blinking pattern and a number of active light elements, causing the wireless energy-harvesting limited node to communicate with the apparatus.

12. A wireless network comprising: a wireless energy-harvesting node which is able to receive data only within unscheduled reception opportunities following external activation of the wireless energy-harvesting node, a coupled device being related to the wireless energy-harvesting node, and the apparatus of claim 11.

13. The wireless network according to claim 12 further comprising a proxy device for relaying communication between the wireless energy-harvesting node and the coupled device.

* * * * *